(12) United States Patent
Yoshida et al.

(10) Patent No.: US 10,726,210 B2
(45) Date of Patent: Jul. 28, 2020

(54) NON-TRANSITORY COMPUTER-READABLE STORAGE MEDIUM, INFORMATION OUTPUTTING METHOD, AND INFORMATION PROCESSING APPARATUS

(71) Applicant: FUJITSU LIMITED, Kawasaki-shi, Kanagawa (JP)

(72) Inventors: Takuya Yoshida, Kawasaki (JP); Ryuichi Takagi, Nakano (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/975,021

(22) Filed: May 9, 2018

(65) Prior Publication Data

US 2018/0329895 A1 Nov. 15, 2018

(30) Foreign Application Priority Data

May 15, 2017 (JP) ................. 2017-096821

(51) Int. Cl.
*G06F 40/58* (2020.01)
*G06K 9/00* (2006.01)
*G06F 16/33* (2019.01)

(52) U.S. Cl.
CPC .......... *G06F 40/58* (2020.01); *G06F 16/3332* (2019.01); *G06F 16/3337* (2019.01); *G06K 9/00442* (2013.01)

(58) Field of Classification Search
CPC .............. G06F 17/289; G06F 16/3332; G06K 9/00442
USPC ............................................................ 704/2
See application file for complete search history.

(56) References Cited

U.S. PATENT DOCUMENTS

2007/0250493 A1* 10/2007 Peoples ............... G06F 16/3337
704/2
2015/0199339 A1* 7/2015 Mirkin ................ G06F 16/3337
704/2

FOREIGN PATENT DOCUMENTS

JP 2014-56457 A 3/2014
WO 2013/014877 A1 1/2013

* cited by examiner

*Primary Examiner* — Quynh H Nguyen
(74) *Attorney, Agent, or Firm* — Westerman, Hattori, Daniels & Adrian, LLP (57) ABSTRACT

A non-transitory computer-readable storage medium storing a program that causes a computer to execute a process, the process including receiving a first text written in a first language, generating a second text written in a second language, the second text being generated by translating the first text into the second language, generating a third text written in the first language, the third text being generated by translating the second text into the first language, specifying one or more first words included in the third text, extracting one or more documents including the one or more first words from a plurality of documents stored in a storage device, and outputting information regarding the one or more extracted documents.

8 Claims, 6 Drawing Sheets

NON-TRANSITORY COMPUTER-READABLE STORAGE MEDIUM, INFORMATION OUTPUTTING METHOD, AND INFORMATION PROCESSING APPARATUS

CROSS-REFERENCE TO RELATED APPLICATION

This application is based upon and claims the benefit of priority of the prior Japanese Patent Application No. 2017-96821, filed on May 15, 2017, the entire contents of which are incorporated herein by reference.

FIELD

The embodiment discussed herein is related to a non-transitory computer-readable storage medium, an information outputting method, and an information processing apparatus.

BACKGROUND

In search systems used for frequently asked questions (FAQ) searching or the like, searching has been conventionally done by accepting an input of a search query statement and extracting a word(s) serving as a keyword(s) from the received search query statement. In fuzzy string searching, it has been proposed to do fuzzy string searching by machine-translating, using a database in which text in a first language and its translation in a second language are associated with each other, a query statement in the first language into the second language, and to output text in the first language corresponding to the result of fuzzy string searching. In addition, it has been proposed to translate, in machine translation, an input statement from a first language into a second language, back-translate the translation result, and, based on a distance between the input statement and the back-translation result, calculate the translation reliability.

Examples of the foregoing technologies are discussed in Japanese Laid-open Patent Publication No. 2014-056457 and International Publication Pamphlet No. WO 2013/014877.

SUMMARY

According to an aspect of the invention, a non-transitory computer-readable storage medium storing a program that causes a computer to execute a process, the process including receiving a first text written in a first language, generating a second text written in a second language, the second text being generated by translating the first text into the second language, generating a third text written in the first language, the third text being generated by translating the second text into the first language, specifying one or more first words included in the third text, extracting one or more documents including the one or more first words from a plurality of documents stored in a storage device, and outputting information regarding the one or more extracted documents.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

A word serving as a keyword in a search query statement and a word in a search target document may be in different languages, or, even when they are in the same language, they may be represented differently. In such a case, the degree of match between a word serving as a keyword in a search query statement and a word in a search target document becomes lower, thereby lowering the search precision. This may result in reduction of the precision of target document extraction.

In one aspect, it is an object of the disclosure of the present application to increase the document extraction precision.

Hereinafter, an embodiment disclosed by the present application will be described based on the drawings. The disclosed technology is not limited by the embodiment.

Embodiment

Figure 1:
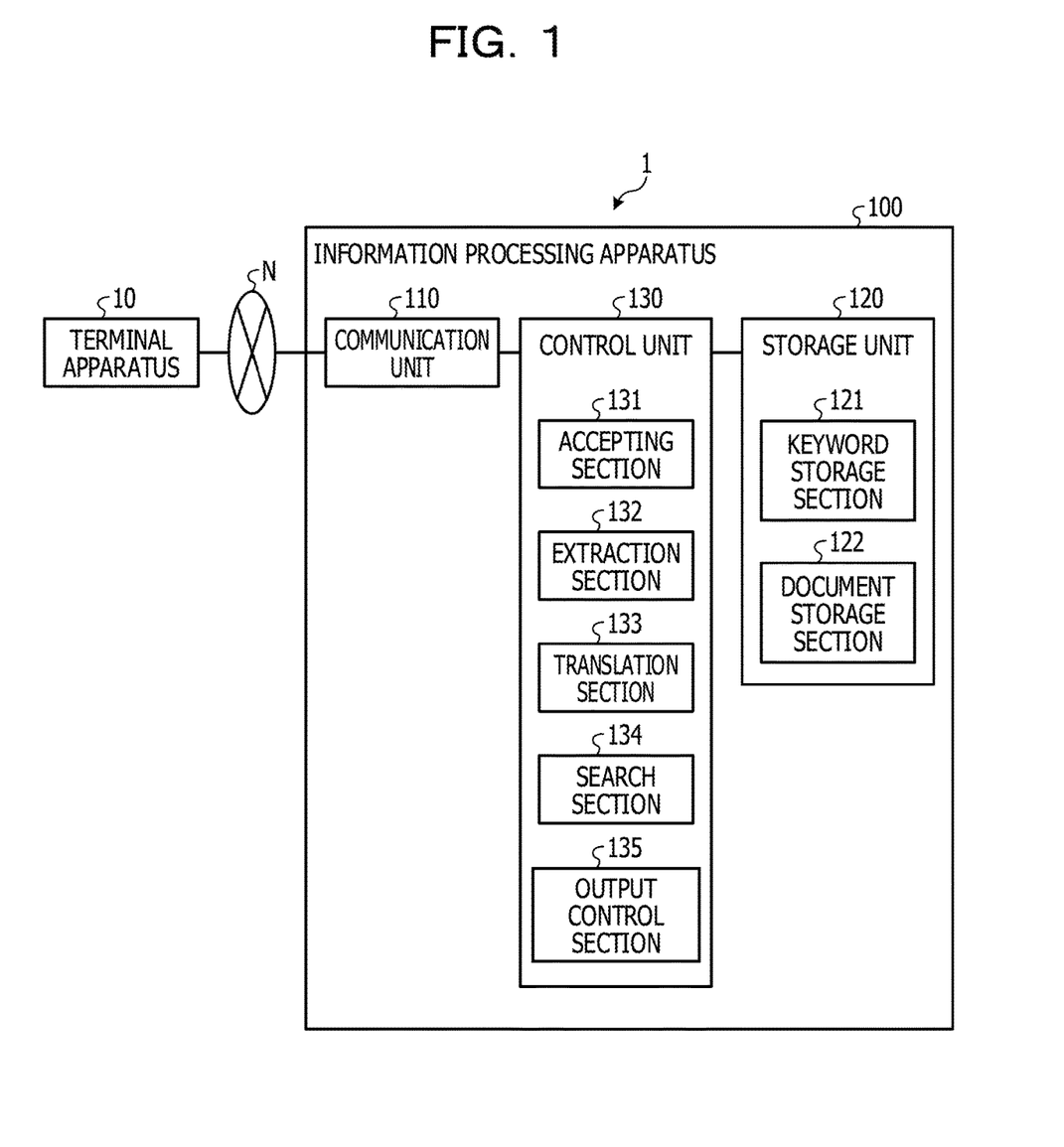
FIG. 1 is a block diagram of an example of the configuration of an information processing system according to an embodiment.

FIG. 1 is a block diagram illustrating an example of the configuration of an information processing system according to an embodiment. An information processing system 1 illustrated in FIG. 1 includes a terminal apparatus 10 and an information processing apparatus 100. The number of terminal apparatuses 10 is not limited, and there may be an arbitrary number of terminal apparatuses 10. The terminal apparatus 10 and the information processing apparatus 100 are connected to each other via a network N to be able to communicate information with each other. The network N may be wired or wireless, and an arbitrary type of communication network is adoptable, such as the Internet, a local area network (LAN), and a virtual private network (VPN).

The terminal apparatus 10 is, for example, an information processing apparatus for a user to use a search service provided by the information processing apparatus 100, and a portable or desktop personal computer (PC) or the like may be used as the terminal apparatus 10. Alternatively, a mobile communication terminal such as a smartphone and a tablet terminal may be used as the terminal apparatus 10. The terminal apparatus 10 accepts from a user a search query statement in a first language, such as Japanese, a second language serving as a translation target language, such as English, and information on whether or not to use back-translation. The terminal apparatus 10 transmits the accepted search query statement, the second language serving as a translation target language, and the information on whether or not to use back-translation to the information processing apparatus 100 via the network N. In addition, the terminal apparatus 10 receives a search result from the information processing apparatus 100 via the network N. The terminal apparatus 10 displays the received search result on a display (not illustrated).

The information processing apparatus 100 receives and accepts the search query statement, the second language serving is a translation target language, and the information on whether or not to use back-translation from the terminal apparatus 10 via the network N. That is, the information processing apparatus 100 accepts first text (search query statement) written in a first language. The information processing apparatus 100 translates the accepted first text into a second language and generates second text written in the second language. The information processing apparatus 100 translates the generated second text into the first language and generates third text written in the first language. The information processing apparatus 100 extracts one or more words included in the generated third text. The information processing apparatus 100 refers to a storage unit that stores a plurality of documents and extracts, from the plurality of documents, a document including the extracted word(s). The information processing apparatus 100 outputs information regarding the extracted document. That is, the information processing apparatus 100 transmits a search result to the terminal apparatus 10 via the network N. Accordingly, the information processing apparatus 100 can increase the document extraction precision.

Figure 2:
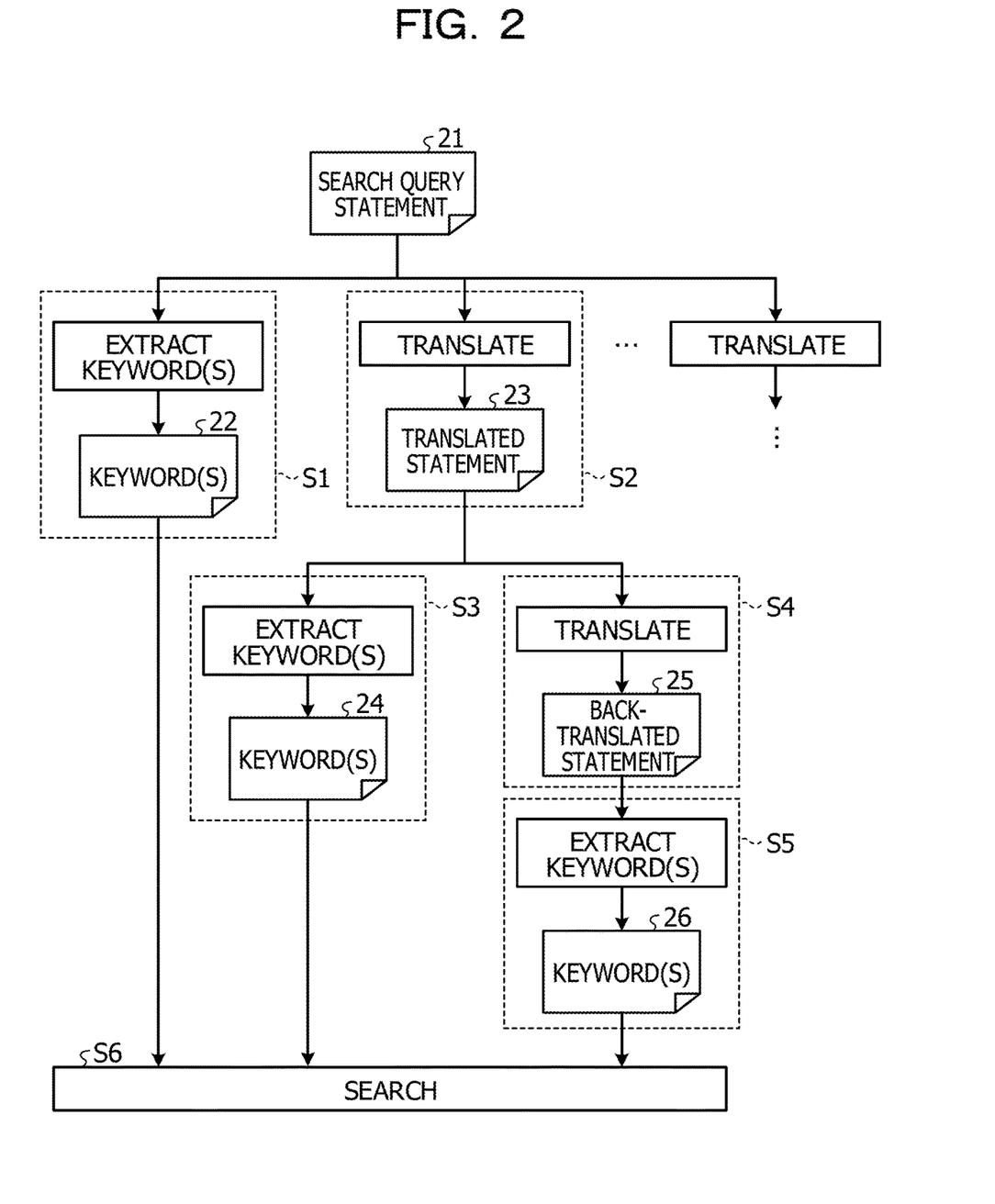
FIG. 2 is a diagram describing a keyword used in searching.

Here, a keyword used in searching will be described using FIG. 2. FIG. 2 is a diagram describing a keyword used in searching. In the example illustrated in FIG. 2, at first, the information processing apparatus 100 extracts a keyword 22 from a search query statement 21 in a first language (step S1). Next, the information processing apparatus 100 translates the search query statement 21 into a second language and generates a translated statement 23 (step S2). The information processing apparatus 100 extracts a keyword 24 from the translated statement 23 (step S3). In addition, the information processing apparatus 100 translates the translated statement 23 into the first language, that is, performs back-translation, and generates a back-translated statement 25 (step S4). The information processing apparatus 100 extracts a keyword 26 from the back-translated statement 25 (step S5). The information processing apparatus 100 executes a search using the keyword 22, the keyword 24, and the keyword 26 (step S6). In the processing from step S2 to step S5 using the second language, an arbitrary number of languages, such as English and Germany, may be used as second languages. In this manner, the information processing apparatus 100 uses, in a search, a keyword extracted from a search query statement, a keyword extracted from a translated statement translated into a second language, and a keyword extracted from a back-translated statement obtained by back-translating the translated text in the second language into a first language. Accordingly, because the information processing apparatus 100 can absorb language differences, orthographical variants, and the like, the information processing apparatus 100 can increase the document extraction precision serving as a search result.

Next, the configuration of the information processing apparatus 100 will be described. As illustrated in FIG. 1, the information processing apparatus 100 includes a communication unit 110, a storage unit 120, and a control unit 130. The information processing apparatus 100 may include, besides the functional units illustrated in FIG. 1, various functional units included in an existing computer, such as various input devices and audio output devices.

The communication unit 110 is realized by, for example, a network interface card (NIC). The communication unit 110 is connected by wire or wirelessly to the terminal apparatus 10 via the network N, and is a communication interface responsible for communicating information with the terminal apparatus 10. The communication unit 110 outputs a search query statement received from the terminal apparatus 10, a second language serving as a translation target language, and information on whether or not to use back-translation to the control unit 130. In addition, the communication unit 110 transmits a search result input from the control unit 130 to the terminal apparatus 10.

The storage unit 120 is realized by random-access memory (RAM), a semiconductor memory device such as flash memory, or a storage device such as a hard disk and an optical disc. The storage unit 120 includes a keyword storage section 121 and a document storage section 122. The storage unit 120 stores information used in processing performed by the control unit 130.

Figure 3:
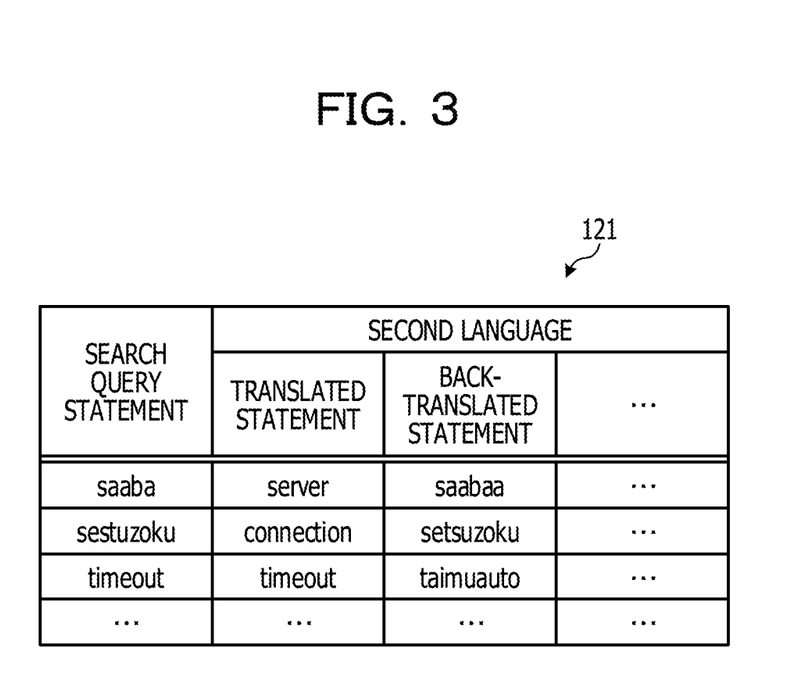
FIG. 3 is a diagram illustrating an example of a keyword storage section.

The keyword storage section 121 stores keywords extracted from a search query statement, a translated statement, and a back-translated statement. FIG. 3 is a diagram illustrating an example of the keyword storage section 121. As illustrated in FIG. 3, the keyword storage section 121 has items such as "search query statement" and "second language". In addition, "second language" has items such as "translated statement" and "back-translated statement". The keyword storage section 121 stores, for example, each keyword in a search query statement as one record.

The item "search query statement" is information indicating a keyword extracted from a search query statement. The item "translated statement" is information indicating a keyword extracted from a translated statement translated into a second language. The item "back-translated statement" is information indicating a keyword extracted from a back-translated statement obtained by back-translating the translated statement in the second language into a first language. In an example on the first line in FIG. 3, the keyword "saaba" (in English: server) extracted from the search query statement is stored in association with the keyword "server" extracted from the translated statement and the keyword "saabaa" (in English: server) extracted from the back-translated statement. In an example on the second line in FIG. 3, the case is indicated where the keyword "setsuzoku" (in English: connection) extracted from the search query statement is identical to the keyword "setsuzoku" (in English: connection) extracted from the back-translated statement. When a search query statement includes a word in a second language, as in the third line in FIG. 3, keywords in both the search query statement and the translated statement are both "timeout".

Referring back to FIG. 1, the document storage section 122 stores a plurality of search target documents. The document storage section 122 stores, for example, a manual of a certain system, a general glossary for a call center, and the like as documents. The document storage section 122 may store other documents. In addition, when an external search engine is used for searching, the document storage section 122 may have the configuration of this search engine. The control unit 130 is realized by executing, by a central processing unit (CPU), a micro-processing unit (MPU), or the like, a program stored in an internal storage device using RAM as a work space. In addition, the control unit 130 may be realized by an integrated circuit such as an application-specific integrated circuit (ASIC) or a field-programmable gate array (FPGA).

The control unit 130 includes an accepting section 131, an extraction section 132, a translation section 133, a search section 134, and an output control section 135, and realizes or executes the functions and operations of information processing described later. That is, the processing sections of the control unit 130 execute an information outputting process. Note that the internal configuration of the control unit 130 is not limited to the configuration illustrated in FIG. 1 and may be other configurations as long as these configurations perform information processing described later.

The accepting section 131 receives and accepts a search query statement, a second language serving as a translation target language, and information on whether or not to use back-translation from the terminal apparatus 10 via the network N and the communication unit 110. That is, the accepting section 131 accepts first text written in a first language. The accepting section 131 outputs the accepted search query statement, that is, the search query statement in the first language, and the second language serving as a translation target language to the extraction section 132 and the translation section 133. In addition, the accepting section 131 outputs the information on whether or not to use back-translation to the extraction section 132.

In response to an input of the accepted search query statement from the accepting section 131, the extraction section 132 extracts keywords from the accepted search query statement. The extraction section 132 divides the search query statement into, for example, parts of speech, and extracts a keyword from each part of speech. In addition, the extraction section 132 may extract keywords using, for example, a morphological analysis. Furthermore, when the first language is written in the Latin script, as in English, the extraction section 132 may extract keywords based on word dividers. The extraction section 132 stores the extracted keywords as keywords extracted from the search query statement in the keyword storage section 121.

In response to an input of a translated statement translated into the second language from the translation section 133, the extraction section 132 extracts keywords from the translated statement. The extraction section 132 stores the extracted keywords as keywords extracted from the translated statement in the keyword storage section 121. Having stored the extracted keywords in the keyword storage section 121, the extraction section 132 determines, based on the information on whether or not to perform back-translation, which is input from the accepting section 131, whether or not to perform back-translation of the translated statement into the first language, that is, the language of the accepted search query statement. When it is determined to perform back-translation, the extraction section 132 outputs a back-translation instruction to the translation section 133 to perform back-translation of the translated statement into the first language.

In response to an input of a back-translated statement from the translation section 133, the extraction section 132 extracts keywords from the back-translated statement. The extraction section 132 stores the extracted keywords as keywords extracted from the back-translated statement in the keyword storage section 121. Having stored the extracted keywords in the keyword storage section 121, the extraction section 132 determines, based on the second language(s) input from the accepting section 131, whether or not there is a next second language. Similarly, in the case where it is determined not to perform back-translation in determination of whether or not to perform back-translation, the extraction section 132 determines whether or not there is a next second language. When there is a next second language, the extraction section 132 outputs a translation instruction to the translation section 133 to translate the search query statement into the next second language. When there is no next second language, the extraction section 132 outputs a search instruction to the search section 134.

In other words, the extraction section 132 extracts one or more words included in third text, which is a generated back-translated statement. In addition, the extraction section 132 extracts one or more words included in second text, which is a generated translated statement. In addition, the extraction section 132 extracts one or more words included in each of generated pieces of third text. In short, the extraction section 132 is an example of a first extraction unit or an extraction unit.

A search query statement in a first language, and a second language serving as a translation target language are input from the accepting section 131 to the translation section 133. The translation section 133 translates the input search query statement in the first language into the second language. At this time, the translation section 133 translates the search query statement into a translated statement in the second language by taking into consideration the positional and modification relationships of a plurality of words included in the search query statement. The translation section 133 outputs the translated statement in the second language to the extraction section 132.

In response to a back-translation instruction from the extraction section 132, the translation section 133 back-translates the translated statement in the second language into the first language. The translation section 133 outputs the back-translated statement to the extraction section 132. In addition, in response to an input of a translation instruction from the extraction section 132, the translation section 133 translates the search query statement into a next second language. The translation section 133 outputs the translated statement in the second language to the extraction section 132.

In other words, the translation section 133 translates accepted first text into a second language and generates second text written in the second language. In addition, the translation section 133 translates the generated second text into a first language and generates third text written in the first language. In other words, the translated statement is the second text, and the back-translated statement is the third text. In addition, the translation section 133 translates accepted first text into a plurality of second languages and generates a plurality of pieces of second text written in the plurality of second languages. In addition, the translation section 133 translates the generated plurality of pieces of second text into the first language and generates a plurality of pieces of third text written in the first language. That is, the translation section 133 is an example of a first generation unit that generates second text, and a second generation unit that generates third text.

In response to an input of a search instruction from the extraction section 132, the search section 134 obtains a keyword group from the keyword storage section 121. Using the obtained keyword group, the search section 134 searches a plurality of documents stored in the document storage section 122 and obtains one or more documents including the keyword group. The search section 134 outputs the obtained document(s), that is, the search result, to the output control section 135.

In other words, the search section 134 refers to the document storage section 122, which stores a plurality of documents, and extracts, from the plurality of documents, one or more documents including the extracted word(s). In short, the search section 134 is an example of a second extraction unit that extracts a including the extracted word or words.

In response to an input of a search result from the search section 134, the output control section 135 transmits the input search result to the terminal apparatus 10 via the communication unit 110 and the network N. That is, the output control section 135 outputs information regarding the extracted document(s).

Figure 4:
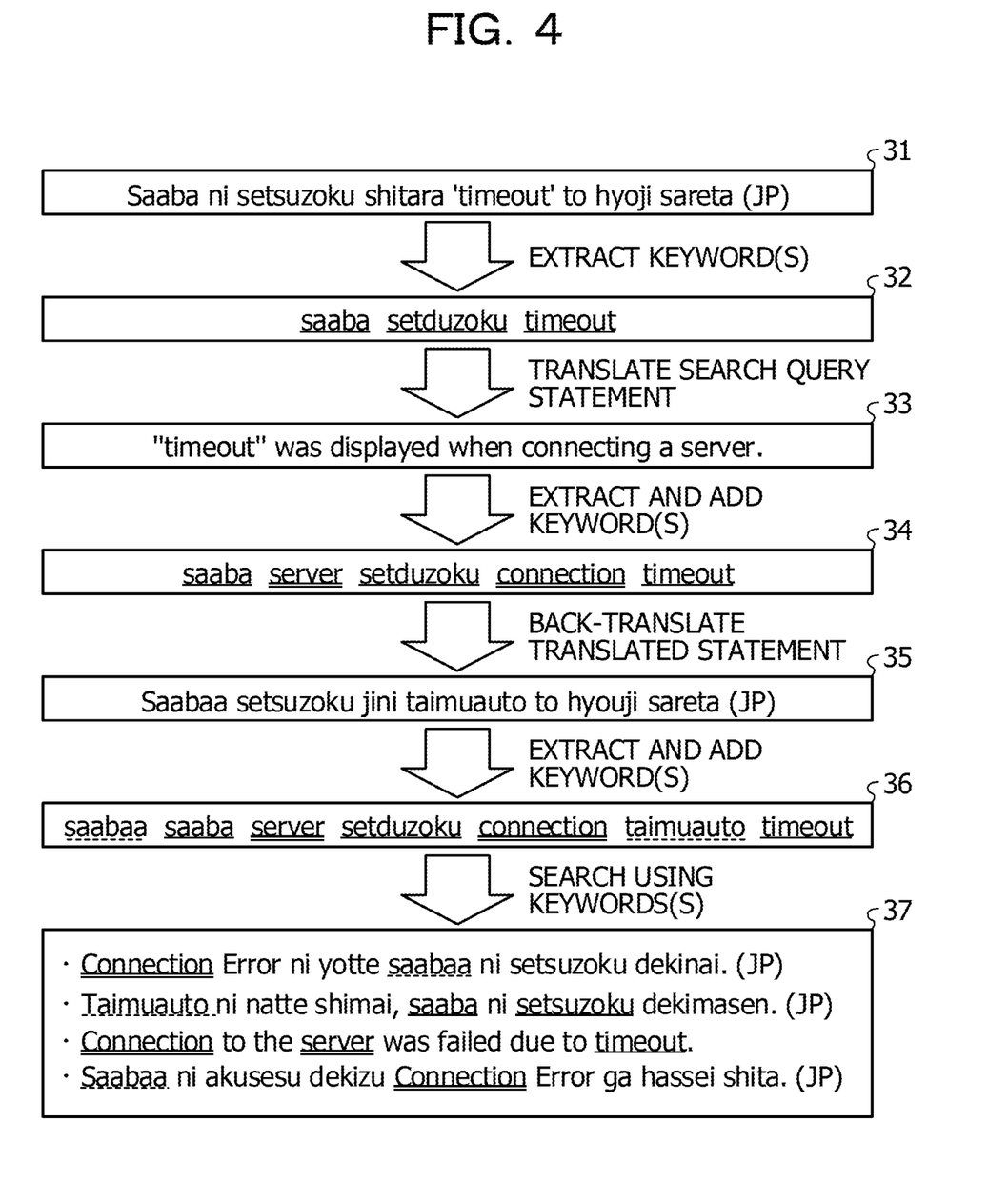
FIG. 4 is a diagram illustrating an example of a search query statement and a search result.

Here, using FIG. 4, keywords and a search result for a certain search query statement will be described. Although the following description will be given using text in place of a document, it is assumed that text is included in a document. FIG. 4 is a diagram illustrating an example of a search query statement and a search result. As illustrated in FIG. 4, the information processing apparatus 100 accepts a search query statement 31 in Japanese, which is a first language, and extracts keywords from the search query statement 31. It is assumed that the search query statement 31 is, for example, "Saaba ni setsuzoku shitara 'timeout' to hyoji sareta." (in English: When connecting to the server, "timeout" was displayed.) A keyword group 32 includes keywords extracted from the search query statement 31, and these keywords are, for example, "saaba" (in English: server), "setsuzoku" (in English: connection), and "timeout".

Next, the information processing apparatus 100 translates the search query statement 31 and obtains a translated statement 33. It is assumed that the translated statement 33 is, for example, "'timeout' was displayed when connecting a server." The information processing apparatus 100 extracts keywords from the translated statement 33. A keyword group 34 includes the keyword group 32 and additional keywords extracted from the translated statement 33. For example, "server" and "connection" are extracted and added.

Next, the information processing apparatus 100 back-translates the translated statement 33 and obtains a back-translated statement 35. It is assumed that the back-translated statement 35 is, for example, "Saabaa setsuzoku jini taimuauto to hyouji sareta." (in English: At the time of connecting to the server, "timeout" was displayed.) The information processing apparatus 100 extracts keywords from the back-translated statement 35. A keyword group 36 includes the keyword group 34 and additional keywords extracted from the back-translated statement 35. For example, "saabaa" (in English: server) and "taimuauto" (in English: timeout) are extracted and added.

The information processing apparatus 100 conducts a search using the keywords included in the keyword group 36 and obtains a search result 37. The search result 37 includes text including one or more keywords (words) among the keywords extracted from the search query statement 31, the translated statement 33, and the back-translated statement 35. Although not illustrated, a search result may contain a search score, and the search score may be output along with the search result. The search result 37 includes, for example, the text "Connection Error ni yotte saabaa ni setsuzoku dekinai." (in English: Due to a connection error, no connection can be established with the server.), which includes "connection" added in the keyword group 34, and "saabaa" (in English: server) added in the keyword group 36. In addition, the search result 37 includes, for example, the text "Taimuauto ni natte shimai, saaba ni setsuzoku dekimasen." (in English: a timeout occurred, and no connection can be established with the server.), which includes "taimuauto" (in English: timeout) added in the keyword group 36 and "saaba" (in English: server) and "setsuzoku" (in English: connection) in the keyword group 32.

Documents stored in the document storage section 122 may include not only documents in a first language, but also documents in one or more second languages or documents written in a mixture of a first language and a second language(s). In the example of the search result 37, the text on the third line "Connection to the server was failed due to timeout." is text including "connection" and "server" added in the keyword group 34 and "timeout" in the keyword group 32. The text on the third line is text in English, which is a second language, and is an example of an error message. In this manner, because the information processing apparatus 100 can absorb language differences and expression differences, the searching precision can be improved.

Figure 5:
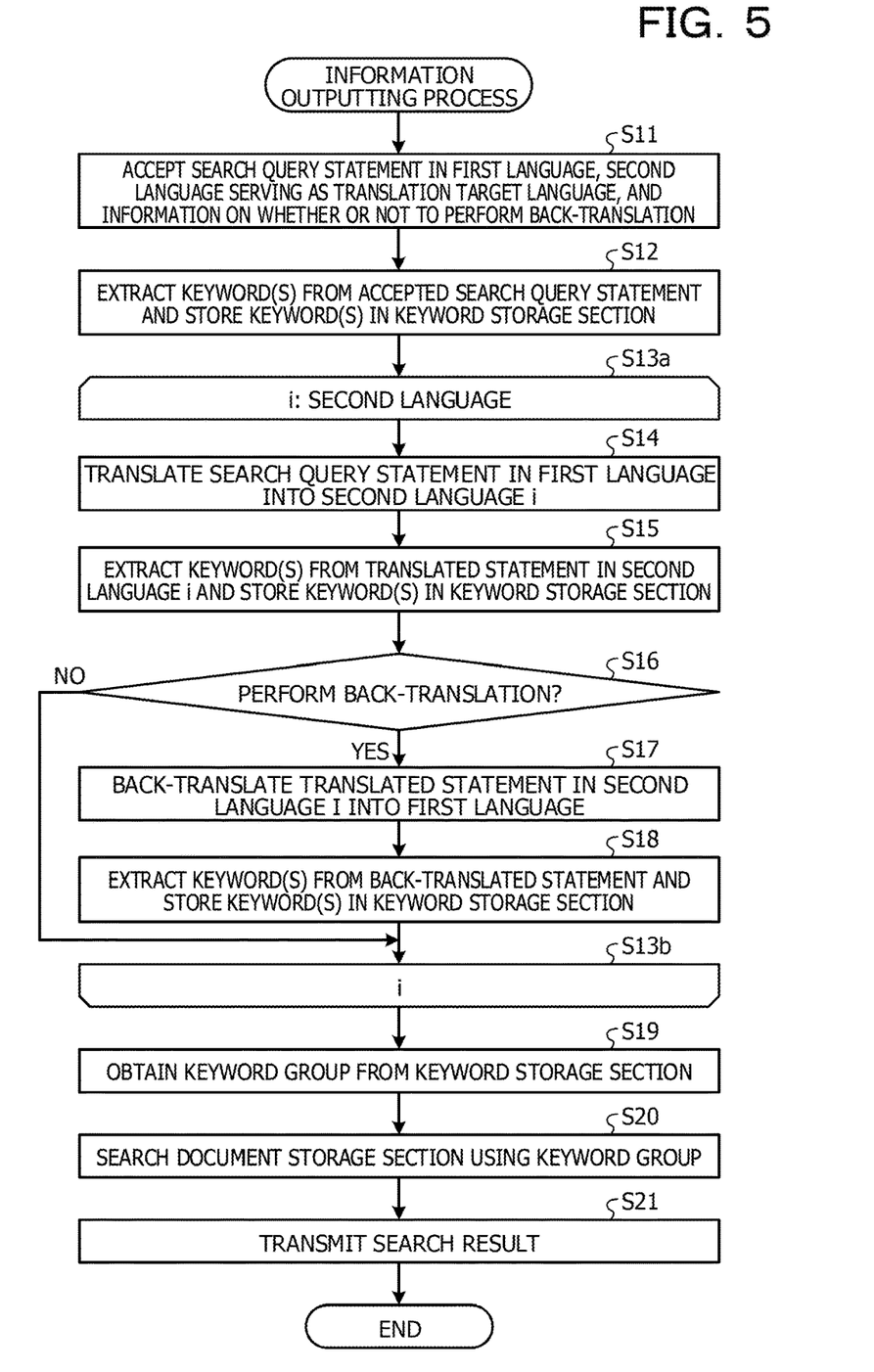
FIG. 5 is a flowchart illustrating an example of an information outputting process according to the embodiment.

Next, the operation of the information processing system 1 according to the embodiment will be described. FIG. 5 is a flowchart illustrating an example of an information outputting process according to the embodiment.

The accepting section 131 of the information processing apparatus 100 receives and accepts a search query statement, a second language serving as a translation target language, and information on whether or not to use back-translation from the terminal apparatus 10 (step S11). The accepting section 131 outputs the accepted search query statement and the second language serving as a translation target language to the extraction section 132 and the translation section 133. In addition, the accepting section 131 outputs the information on whether or not to use back-translation to the extraction section 132.

In response to an input of the accepted search query statement from the accepting section 131, the extraction section 132 extracts keywords from the accepted search query statement. The extraction section 132 stores the extracted keywords as keywords extracted from the search query statement in the keyword storage section 121 (step S12).

The search query statement accepted from the accepting section 131, that is, the search query statement in the first language, and the second language serving as a translation target language are input to the translation section 133. In response to an input of the search query statement and the second language, for a second language i, the translation section 133 repeats the processing from step S13a to step S13b in order to execute translation into the second language i and keyword extraction, and back-translation into the first language and keyword extraction.

The translation section 133 translates the input search query statement in the first language into the second language i (step S14). The translation section 133 outputs the translated statement in the second language i to the extraction section 132.

In response to an input of the translated statement in the second language i from the translation section 133, the extraction section 132 extracts keywords from the translated statement. The extraction section 132 stores the extracted keywords as keywords extracted from the translated statement in the keyword storage section 121 (step S15). Having stored the extracted keywords in the keyword storage section 121, the extraction section 132 determines, based on the information on whether or not to perform back-translation, whether or not to perform back-translation of the translated statement into the first language (step S16). When it is determined to perform back-translation (affirmative in step S16), the extraction section 132 outputs a back-translation instruction to the translation section 133 to perform back-translation of the translated statement into the first language.

When it is determined not to perform back-translation (negative in step S16), the extraction section 132 proceeds to step S13b. When there is a next second language i, the extraction section 132 outputs a translation instruction to the translation section 133, and executes processing from step S13a to step S13b for the next second language i. When there is no next second language i, the extraction section 132 outputs a search instruction to the search section 134.

In response to a back-translation instruction from the extraction section 132, the translation section 133 back-translates the translated statement in the second language i into the first language (step S17). The translation section 133 outputs the back-translated statement to the extraction section 132.

In response to an input of a back-translated statement from the translation section 133, the extraction section 132 extracts keywords from the input back-translated statement. The extraction section 132 stores the extracted keywords as keywords extracted from the back-translated statement in the keyword storage section 121 (step S18). In response to completion of keyword extraction from the back-translated statement for the second language i, the extraction section 132 proceeds to step S13b. When there is a next second language i, the extraction section 132 outputs a translation instruction to the translation section 133, and executes processing from step S13a to step S13b for the next second language i. When there is no next second language i, the extraction section 132 outputs a search instruction to the search section 134.

In response to an input of a search instruction from the extraction section 132, the search section 134 obtains a keyword group from the keyword storage section 121 (step S19). Using the obtained keyword group, the search section 134 searches a plurality of documents stored in the document storage section 122 (step S20) and obtains one or more documents including the keyword group. The search section 134 outputs the obtained document(s), that is, the search result, to the output control section 135.

In response to an input of the search result from the search section 134, the output control section 135 transmits the input search result to the terminal apparatus 10 (step S21). Accordingly, the information processing apparatus 100 can increase the document extraction precision. In addition, because the information processing apparatus 100 can absorb language differences and expression differences, the searching precision can be improved. In addition, because the information processing apparatus 100 can select and combine translation target languages, adaptation to the characteristics of search target data (document) becomes easier. In addition, the information processing apparatus 100 can perform fuzzy string searching on text not in the form of questions and answers or text including lists of words and short statements.

Although searching is done on documents stored in the document storage section 122 of the information processing apparatus 100, the search target is not limited to these documents. For example, the information processing apparatus 100 may transmit an extracted keyword group to a search engine that searches a plurality of documents in response to an input of a word and outputs a search result, and may obtain, as a search result, one or more documents including the word(s) in the keyword group. In this case, for example, an external search engine or search service may be used as the search engine. For example, the information processing apparatus 100 transmits one or more extracted keywords to a search engine that outputs a search result in response to an input of a word, and obtains a document including the extracted word(s), which is a search result, from the search engine. That is, the information processing apparatus 100 may be provided with, instead of the above-mentioned search section 134, that is, a function corresponding to a second extraction unit, an obtaining unit that obtains a search result from a search engine. Accordingly, the information processing apparatus 100 can do searching not only on documents stored in the document storage section 122 of the information processing apparatus 100, but also on documents held by an external search engine.

In this manner, the information processing apparatus 100 accepts first text written in a first language. In addition, the information processing apparatus 100 translates the accepted first text into a second language and generates second text written in the second language. In addition, the information processing apparatus 100 translates the generated second text into the first language and generates third text written in the first language. The information processing apparatus 100 extracts one or more words included in the generated third text. In addition, the information processing apparatus 100 refers to the document storage section 122, which stores a plurality of documents, and extracts, from the plurality of documents, one or more documents including the extracted word(s). The information processing apparatus 100 outputs information regarding the extracted document(s). As a result, the information processing apparatus 100 can increase the document extraction precision.

The information processing apparatus 100 extracts one or more words included in the generated second text. As a result, because the information processing apparatus 100 does searching using keywords included in the translated statement and the back-translated statement, the information processing apparatus 100 can absorb language differences and expression differences.

In addition, the information processing apparatus 100 translates accepted first text into a plurality of second languages and generates a plurality of pieces of second text written in the plurality of second languages. In addition, the information processing apparatus 100 translates the generated plurality of pieces of second text into the first language and generates a plurality of pieces of third text written in the first language. The information processing apparatus 100 extracts one or more words included in each of the generated plurality of pieces of third text. As a result, the information processing apparatus 100 can absorb language differences and expression differences over a plurality of languages, and further improve the document extraction precision.

The information processing apparatus 100 accepts first text written in a first language. In addition, the information processing apparatus 100 translates the accepted first text into a second language and generates second text written in the second language. In addition, the information processing apparatus 100 translates the generated second text into the first language and generates third text written in the first language. The information processing apparatus 100 extracts one or more words included in the generated third text. In addition, the information processing apparatus 100 transmits the extracted word(s) to a search engine that outputs a search result in response to an input of a word, and obtains one or more documents including the extracted word(s), which is a search result, from the search engine. The information processing apparatus 100 outputs information regarding the obtained document(s). As a result, the information processing apparatus 100 can increase the document extraction precision while utilizing an external search engine.

Although the information processing apparatus 100 translates text and extracts keywords in the above-described embodiment, translation and keyword extraction may be performed using other services or the like. For example, an external translation engine or translation service, or an external keyword extraction engine or keyword extraction service may be used.

Although translation of a search query statement and back-translation of a translated statement are both done by the translation section 133 in the above-described embodiment, translation and back-translation may be performed using different services or the like. For example, translation of a search query statement and back-translation of a translated statement may be done using different translation engines. In this case, the translation section 133 may be provided with a plurality of translation engines, or an external translation engine(s) may be used as one or more translation engines.

Although the terminal apparatus 10 is directly connected to the information processing apparatus 100 to perform the information outputting process in the above-described embodiment, the operation is not limited to this case. For example, the information processing apparatus 100 may provide an application programming interface (API) regarding the information outputting process, and, for example, the terminal apparatus 10 may call the API using a web browser or the like.

The elements of each unit or section illustrated in the drawings do not have to be physically configured as illustrated. That is, specific forms of distribution and integration of each unit or section are not limited to those illustrated in the drawings, and all or a part thereof may be functionally or physically distributed or integrated in arbitrary units according to various loads, usage conditions, and the like. For example, the search section 134 and the output control section 135 may be integrated. In addition, the processes illustrated in the drawings do not have to be executed in the above-described order, and the processes may be executed simultaneously or in a rearranged order within a scope that does not contradict the processing details.

Furthermore, all or an arbitrary part of various processing functions performed by the apparatuses may be executed on a CPU (or a micro-computer such as an MPU a microcontroller unit (MCU)). In addition, all or an arbitrary part of these various processing functions may be executed on a program analyzed and executed by a CPU (or a microcomputer such as an MPU or an MCU) or on wired-logic hardware.

Figure 6:
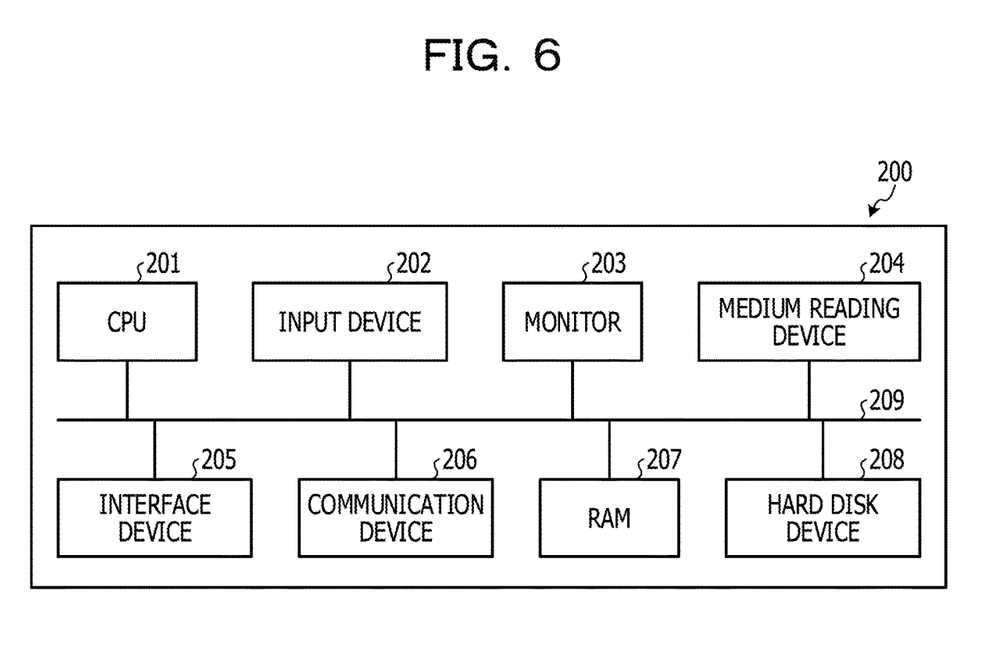
FIG. 6 is a diagram illustrating an example of a computer executing an information outputting program.

By the way, various processes described in the above-described embodiment can be realized by executing a prepared program on a computer. Hereinafter, an example of a computer that executes a program with the same functions as those in the above-described embodiment will be described. FIG. 6 is a diagram illustrating an example of a computer executing an information outputting program.

As illustrated in FIG. 6, a computer 200 includes a CPU 201, which executes various arithmetic processes, an input device 202, which accepts a data input, and a monitor 203. The computer 200 additionally includes a medium reading device 204, which reads a program and the like from a storage medium, an interface device 205, which is for connecting to various apparatuses, and a communication device 206, which is for connecting by wire or wirelessly to another information processing apparatus or the like. In addition, the computer 200 includes RAM 207, which temporarily stores various types of information, and a hard disk drive 208. The devices 201 to 208 are connected to a bus 209.

The hard disk drive 208 stores an information outputting program with the same functions as the processing sections, namely, the accepting section 131, the extraction section 132, the translation section 133, the search section 134, and the output control section 135, which are illustrated in FIG. 1. In addition, the hard disk drive 208 stores the keyword storage section 121, the document storage section 122, and various types of data for realizing the information outputting program. The input device 202 accepts an input of various types of information, such as operation information, from the administrator of the computer 200. The monitor 203 displays various screens, such as a display screen, to the administrator of the computer 200. For example, a printer is connected to the interface device 205. The communication device 206 has the same function as, for example, the communication unit 110 illustrated in FIG. 1, is connected to the network N, and exchanges various types of information with the terminal apparatus 10 or another information processing apparatus.

The CPU 201 reads each of the programs stored in the hard disk drive 208, expands the program in the RAM 207, and executes the program, thereby performing various processes. These programs may cause the computer 200 to function as the accepting section 131, the extraction section 132, the translation section 133, the search section 134, and the output control section 135, which are illustrated in FIG. 1.

The above-mentioned information outputting program does not have to be stored in the hard disk drive 208. For example, a program stored in a storage medium readable by the computer 200 may be read and executed by the computer 200. A storage medium readable by the computer 200 corresponds to, for example, compact-disc read-only memory (CD-ROM), a digital versatile disc (DVD), a portable storage medium such as universal serial bus (USB) memory, semiconductor memory such as flash memory, or a hard disk drive. In addition, the information outputting program may be stored in an apparatus connected to a public line, the Internet, a LAN, or the like, and the computer 200 may read the information outputting program from the apparatus and execute the information outputting program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable storage medium storing a program that causes a client-server system including a server and a terminal to execute a process, the process comprising:

receiving, by the server, a first search query from the terminal, the first search query including a first text written in a first language;

generating a second text written in a second language by the server translating the first text into the second language;

generating a third text written in the first language as a second search query by the server translating the second text into the first language, the third text including a word not included in the first text;

electing one or more words from the second search query;

extracting one or more documents including the one or more words from a plurality of documents stored in a storage device by the server inputting the selected one or more words into a search engine to perform searching; and outputting information regarding the one or more extracted documents to the terminal.

2. The non-transitory computer-readable storage medium according to claim 1, wherein the process further comprises:

selecting other one or more words from the second text; and extracting one or more documents including the other one or more words from the plurality of documents by the server inputting the selected other one or more words into the search engine for searching.

3. The non-transitory computer-readable storage medium according to claim 1, wherein the generating of the second text includes generating a plurality of second text by the server translating the first text into the second language in multiple patterns, the generating of the third text includes generating a plurality of third text as a plurality of search queries by the server translating each of the plurality of second text into the first language, and the selecting includes selecting the one or more words from each of the plurality of search queries.

4. The non-transitory computer-readable storage medium according to claim 1, wherein the process further comprises providing an application programming interface, and wherein the receiving receives the first search query via the application programming interface, and the outputting outputs the information regarding the one or more extracted documents via the application programming interface.

5. An information outputting method executed by a client-server system including a server and a terminal, the information outputting method comprising:

receiving, by the server, a first search query from the terminal including a first text written in a first language;

generating a second text written in a second language by the server translating the first text into the second language;

generating a third text written in the first language as a second search query by the server translating the second text into the first language, the third text including a word not included in the first text;

selecting one or more words from the second search query;

extracting one or more documents including the one or more first words from a plurality of documents stored in a storage device by the server inputting the selected one or more words into a search engine to perform searching; and outputting information regarding the one or more extracted documents to the terminal.

6. The information outputting method according to claim 5, further comprising providing an application programming interface, and wherein the receiving receives the first search query via the application programming interface, and the outputting outputs the information regarding the one or more extracted documents via the application programming interface.

7. A client-server system comprising:

a server; and a terminal communicating with the server through a network, wherein the server is configured to execute a process, the process including:

receiving a first search query from the terminal including a first text written in a first language;

generating a second text written in a second language by translating the first text into the second language;

generating a third text written in the first language as a second search query by translating the second text into the first language, the third text including a word not included in the first text;

selecting one or more words from the second search query;

extracting one or more documents including the one or more words from a plurality of documents stored in a storage device by inputting the selected one or more words into a search engine to perform searching based on the selected one or more words; and outputting information regarding the one or more extracted documents to the terminal.

8. The client-server system according to claim 7, wherein the process executed by the server further includes providing an application programming interface, and wherein the receiving receives the first search query via the application programming interface, and the outputting outputs the information regarding the one or more extracted documents via the application programming interface.

* * * * *